United States Patent
Takei et al.

(10) Patent No.: US 8,535,022 B2
(45) Date of Patent: Sep. 17, 2013

(54) BEARING STRUCTURE OF ROTATING MACHINE, ROTATING MACHINE, METHOD OF MANUFACTURING BEARING STRUCTURE, AND METHOD OF MANUFACTURING ROTATING MACHINE

(75) Inventors: Nobuo Takei, Urayasu (JP); Atsushi Mori, Yokohama (JP); Takahiro Kobayashi, Tokyo (JP); Nobuyuki Ikeya, Kawasaki (JP)

(73) Assignee: IHI Corporation (JP)

( * ) Notice: Subject to any disclaimer, the term of this patent is extended or adjusted under 35 U.S.C. 154(b) by 586 days.

(21) Appl. No.: 12/305,231

(22) PCT Filed: Jun. 21, 2006

(86) PCT No.: PCT/JP2006/312413
§ 371 (c)(1),
(2), (4) Date: Dec. 17, 2008

(87) PCT Pub. No.: WO2007/148390
PCT Pub. Date: Dec. 27, 2007

(65) Prior Publication Data
US 2010/0232959 A1    Sep. 16, 2010

(51) Int. Cl.
*F01D 25/16* (2006.01)
*B21D 53/10* (2006.01)

(52) U.S. Cl.
USPC .......................................... 417/407; 415/229

(58) Field of Classification Search
USPC ...... 416/174, 175; 415/229, 158; 60/605.01, 60/605.02, 602; 417/407
See application file for complete search history.

(56) References Cited

U.S. PATENT DOCUMENTS

| | | | |
|---|---|---|---|
| 3,427,083 A * | 2/1969 | Linsi | 384/287 |
| 6,190,048 B1 | 2/2001 | Weissert | 384/103 |
| 6,739,134 B2 * | 5/2004 | Fledersbacher et al. | 60/602 |
| 7,001,142 B2 * | 2/2006 | Knauer et al. | 415/160 |
| 7,097,432 B1 * | 8/2006 | Lombard et al. | 417/295 |
| 7,338,254 B2 * | 3/2008 | Lombard et al. | 415/167 |
| 7,509,804 B2 * | 3/2009 | Kobayashi | 60/602 |
| 2007/0122268 A1 * | 5/2007 | Lombard et al. | 415/158 |
| 2007/0172365 A1 * | 7/2007 | Shimizu et al. | 417/407 |
| 2011/0091323 A1 * | 4/2011 | Koike et al. | 416/175 |

FOREIGN PATENT DOCUMENTS

| | | |
|---|---|---|
| JP | A-62-041837 | 3/1987 |
| JP | 11-336744 | 12/1999 |
| JP | 2001-012460 | 1/2001 |
| JP | 2002-138846 | 5/2002 |

(Continued)

OTHER PUBLICATIONS

International Search Report and Written Opinion mailed Jul. 25, 2006 in corresponding PCT International Application No. PCT/JP2006/312413.

Office Action issued on the counterpart Japanese Patent Application No. 2004-372916, dated Nov. 4, 2009, with English language translation (6 pages).

Office Action (Notice of Allowance) issued on counterpart Japanese Patent Application No. 2004-372916 dated Jul. 20, 2010 with the English translation.

(Continued)

*Primary Examiner* — Anne Hines
*Assistant Examiner* — Jacob R Stern
(74) *Attorney, Agent, or Firm* — Ostrolenk Faber LLP

(57) ABSTRACT

A bearing device includes a turbine-side bearing 21 and a compressor-side bearing 22 each of which is a floating-bush type sliding bearing. A gap (turbine-side inner peripheral clearance TI) between the turbine-side bearing 21 and a rotating shaft 13 is set to be larger than a gap (compressor-side inner peripheral clearance CI) between the compressor-side bearing 22 and the rotating shaft 13. In the bearing structure, unstable vibration including self-excited vibration can be suppressed.

10 Claims, 2 Drawing Sheets

(56) References Cited

FOREIGN PATENT DOCUMENTS

| | | |
|---|---|---|
| JP | 2002-213248 | 7/2002 |
| JP | 2002-213450 | 7/2002 |
| JP | 2002-332864 | 11/2002 |
| JP | 2006-177487 | 7/2006 |

OTHER PUBLICATIONS

Office Action issued in corresponding Japanese Patent Application No. 2010-118634 dated Aug. 2, 2011 with English translation (4 pages).

* cited by examiner

RATIO OF INNER PERIPHERAL CLEARANCE DIFFERENCE (TI-CI)

BEARING STRUCTURE OF ROTATING MACHINE, ROTATING MACHINE, METHOD OF MANUFACTURING BEARING STRUCTURE, AND METHOD OF MANUFACTURING ROTATING MACHINE

CROSS-REFERENCE TO RELATED APPLICATION

The present application is a 35 U.S.C. §§371 national phase conversion of PCT/JP2006/312413, filed Jun. 21, 2006. The PCT International Application was published in the Japanese language.

TECHNICAL FIELD

The present invention relates to a bearing structure used for a high-speed rotating machine such as a supercharger, and more particularly, to a technique for suppressing unstable vibration including self-excited vibration.

BACKGROUND ART

It is known that a bearing structure used for a high-speed rotating machine such as a supercharger includes a floating-bush type sliding bearing (floating-bush bearing). In the bearing structure, the sliding bearing (floating-bush) is rotatably disposed between a rotating shaft and a housing, and lubricating oil is supplied to a gap between the shaft and the bearing and to a gap between the bearing and the housing from corresponding oil supply sources.

In addition, compressing air or an air mixture to be supplied to a cylinder of an internal combustion engine in advance is referred to as "supercharge", and a compressor used for the compression is referred to as a "supercharger". Specifically, a supercharger driven by a gas turbine using exhaust gas of an engine is referred to as an exhaust gas turbine supercharger, or abbreviated to a turbocharger. Hereinafter, except for special cases, the turbocharger is simply called the supercharger.

In the bearing structure with the floating-bush bearing, the shaft rotates inside the bearing with an oil film therebetween, and the rotation of the shaft is accompanied by the rotation of the bearing. In addition, due to the oil film provided on inner and outer peripheral surfaces of the bearing, damping effects can be obtained. Since the difference between velocities of the shaft and the bearing is suppressed by the rotation of the bearing, energy loss caused by the shear stress in the lubricating oil is relatively small.

The floating-bush bearing has a problem in that unstable vibration sometimes occurs in a shaft and bearing system as a vibration mode. It is thought that the unstable vibration occurs due to a behavior of a viscous fluid in the gap between the shaft and the bearing, shaking of the shaft center, or the like, unlike mode characteristics (rotation primary vibration and the like) caused by mechanical unbalance, so that the unstable vibration includes self-excited vibration called oil-whirl, oil-whip, and the like (for example, see Patent Document 1).

In addition, since unstable vibration causes noise during high-speed driving, various techniques for suppressing the unstable vibration have been proposed (for example, see Patent Documents 2, 3, and 4). However, it is difficult to completely suppress the unstable vibration.

Patent Document 1: Japanese Unexamined Patent Application, first publication No. 2002-213450 (paragraph number 0043-0046, FIG. 10)

Patent Document 2: Japanese Unexamined Patent Application, first publication No. 2002-138846

Patent Document 3: Japanese Unexamined Patent Application, first publication No. 2002-213248

Patent Document 4: Japanese Unexamined Patent Application, first publication No. 2001-12460

Patent Document 5: Japanese Unexamined Patent Application, first publication No. H11-336744

DISCLOSURE OF THE INVENTION

Problem to be Solved by the Invention

An object of the invention is to provide a bearing structure capable of suppressing unstable vibration including self-excited vibration.

Means for Solving the Problem

The inventor discovered that in association with a turbine-side bearing and a compressor-side bearing each of which is a floating-bush bearing, among a gap (inner peripheral clearance) between each of the bearings and a rotating axis and a gap (outer peripheral clearance) between each of the bearings and a housing, particularly, by properly setting the inner peripheral clearance, unstable vibration can be suppressed.

According to the invention, a bearing structure of a rotating machine, which is disposed on a rotating shaft connecting a turbine impeller to a compressor impeller, includes: a turbine-side bearing and a compressor-side bearing each of which is a floating-bush type sliding bearing, wherein a turbine-side inner peripheral clearance between the turbine-side bearing and the rotating shaft is set to be larger than a compressor-side inner peripheral clearance between the compressor-side bearing and the rotating shaft.

In the bearing structure, by setting the inner peripheral clearances, unstable vibration can be suppressed.

Here, wherein a ratio of a difference between the turbine-side inner peripheral clearance and the compressor-side inner peripheral clearance to an average of the turbine-side inner peripheral clearance and the compressor-side inner peripheral clearance may be equal to or larger than 0.2.

Specifically, when the turbine-side inner peripheral clearance, the compressor-side inner peripheral clearance, and the average thereof (inner peripheral clearance) are denoted by TI, CI, and AI, respectively, a condition $(TI-CI)/AI \geq 0.2$ may need to be satisfied.

In addition, the bearing structure according to the invention may be applied to a type in which the turbine-side bearing and the compressor-side bearing are integrated.

According to the invention, a rotating machine includes: a turbine impeller; a compressor impeller; a rotating shaft connecting the turbine impeller to the compressor impeller; a housing enclosing the rotating shaft; and a bearing device rotatably supporting the rotating shaft, wherein the bearing device has the above-mentioned bearing structure.

In the rotating machine, since unstable vibration including self-excited vibration is suppressed by the bearing structure, noise during high-speed driving is reduced.

According to the invention, a method of manufacturing a floating-bush type bearing structure, in which a turbine-side bearing and a compressor-side bearing each of which is a floating-bush type and supports a rotating shaft are included, includes: setting the turbine-side inner peripheral clearance between the turbine-side bearing and the rotating shaft to be larger than a compressor-side inner peripheral clearance between the compressor-side bearing and the rotating shaft.

In the method of manufacturing a floating-bush type bearing structure, the low-noise bearing structure which suppresses unstable vibration during high-speed driving is manufactured.

According to the invention, a method of manufacturing a rotating machine having a floating-bush type bearing structure, in which a turbine-side bearing and a compressor-side bearing each of which is a floating-bush type and supports a rotating shaft are included, includes: setting a turbine-side inner peripheral clearance between the turbine-side bearing and the rotating shaft to be larger than a compressor-side inner peripheral clearance between the compressor-side bearing and the rotating shaft.

Here, the ratio of a difference between the turbine-side inner peripheral clearance and the compressor-side inner peripheral clearance to the average of the turbine-side inner peripheral clearance and the compressor-side inner peripheral clearance may be equal to or larger than 0.2.

In the method of manufacturing a rotating machine, the low-noise rotating machine which suppresses unstable vibration during high-speed driving is manufactured.

Effect of the Invention

In the bearing structure of the rotating machine according to the invention, since the inner peripheral clearance of the turbine-side bearing is larger than that of the compressor-side bearing, unstable vibration including self-excited vibration can be suppressed.

In the rotating machine according to the invention, noise during high-speed driving can be reduced by suppressing the unstable vibration.

In the method of manufacturing a bearing structure according to the invention, the low-noise bearing structure with the suppressed unstable vibration can be manufactured.

In the method of manufacturing a rotating machine according to the invention, the low-noise rotating machine with the suppressed unstable vibration can be manufactured.

BRIEF DESCRIPTION OF THE REFERENCE NUMERALS

10: SUPERCHARGER (ROTATING MACHINE)
11: TURBINE IMPELLER
12: COMPRESSOR IMPELLER
13: SHAFT (ROTATING SHAFT)
14: HOUSING
14b: BEARING HOUSING
15: BEARING DEVICE
21: TURBINE-SIDE BEARING (FLOATING-BUSH BEARING)
22: COMPRESSOR-SIDE BEARING (FLOATING-BUSH BEARING)
23: OIL PASSAGE
TO: TURBINE-SIDE OUTER PERIPHERAL CLEARANCE
TI: TURBINE-SIDE INNER PERIPHERAL CLEARANCE
CO: COMPRESSOR-SIDE OUTER PERIPHERAL CLEARANCE
CI: COMPRESSOR-SIDE INNER PERIPHERAL CLEARANCE

BEST MODE FOR CARRYING OUT THE INVENTION

Exemplary embodiments of the invention will now be described with reference to the accompanying drawings.

Figure 1:
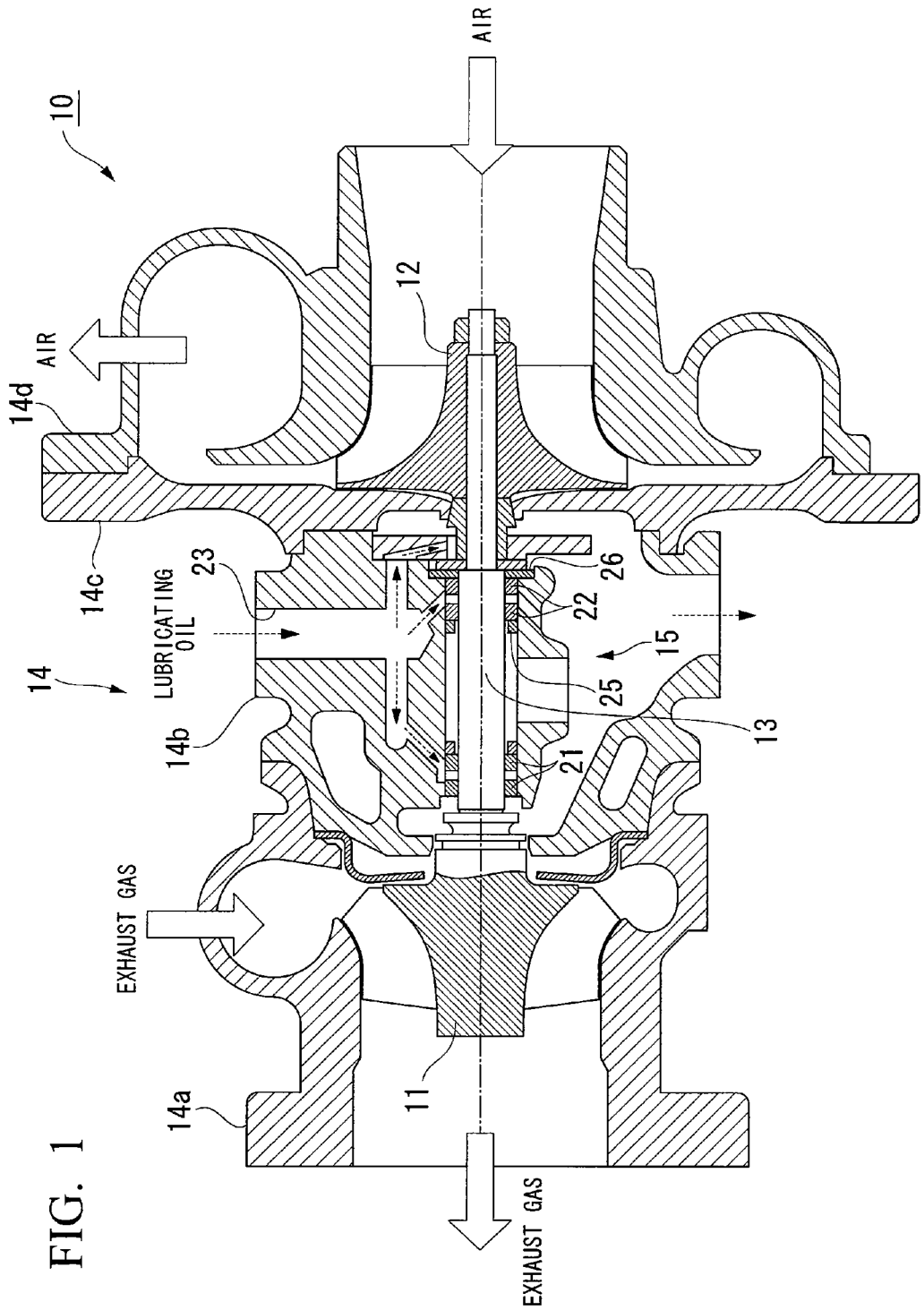
FIG. 1 is a sectional view illustrating the entire configuration of a supercharger (turbocharger) applying a bearing structure according to the invention.

FIG. 1 is a sectional view illustrating the entire configuration of a supercharger (turbocharger) as a rotating machine applying a bearing structure according to the invention.

Referring to FIG. 1, the supercharger 10 includes a turbine impeller 11, a compressor impeller 12, a shaft 13 as a rotating shaft connecting the turbine impeller 11 to the compressor impeller 12, a housing 14 enclosing the aforementioned elements, and a bearing device 15 rotatably supporting the shaft 13 inside the housing 14.

The turbine impeller 11 is integrated into the shaft 13 by performing welding or the like, and the compressor impeller 12 and the shaft 13 are assembled with each other through nuts or the like. The housing 14 includes a turbine housing 14a, a bearing housing 14b, a seal plate 14c, a compressor housing 14d, and the like which are sequentially connected.

When the turbine impeller 11 is rotated by exhaust gas of an internal combustion engine, the torque is transmitted to the compressor impeller 12 through the shaft 13. As the compressor impeller 12 is rotated, compressed air (or an air mixture) is supplied to the internal combustion engine. The number of rotations of the shaft 13 is, for example, tens to hundreds of thousands rpm.

The bearing device 15 has a full-floating-bush bearing structure. Specifically, the bearing device 15 includes two floating-bush bearings (floating metal) 21 and 22 which are separately disposed in an axial direction, and lubricating oil is supplied through an oil passage 23 and the like to gaps between the shaft 13 and the bearings 21 and 22 and gaps between the bearings 21 and 22 and the housing (the bearing housing 14b). In addition, loads in the thrust direction of the shaft 13 are supported by a thrust bearing 25, a collar 26, and the like.

In the bearing device 15, an oil film is formed and maintained on inner peripheral surfaces and outer peripheral surfaces of the bearings 21 and 22, and the shaft 13 rotates inside the bearings 21 and 22 through the oil film. In addition, the rotation of the shaft 13 is accompanied by the rotation of the bearings 21 and 22 inside the bearing housing 14b through the oil film. The ratio in rotation frequency of the bearings 21 and 22 to the shaft 13 is about several tens of percentage points. Due to the oil film formed on the inner peripheral surfaces and the outer peripheral surfaces of the bearings 21 and 22, damping effects can be obtained. Since velocity differences between the shaft 13 and the bearings 21 and 22 are suppressed by the rotation of the bearings 21 and 22, energy loss caused by the shear stress in the lubricating oil is relatively small.

Figure 2:
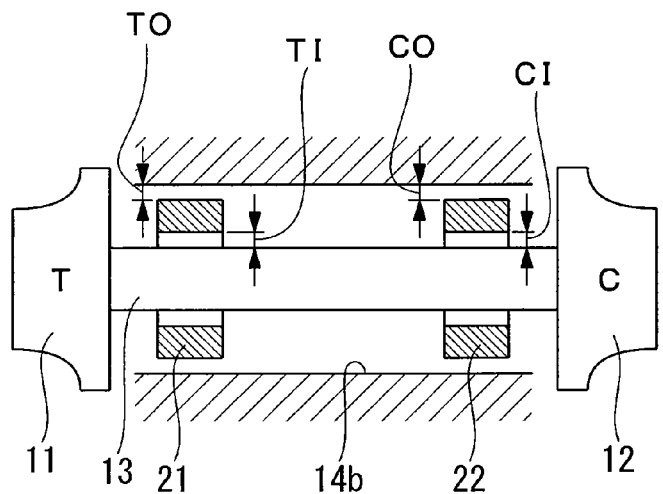
FIG. 2 is a view schematically illustrating a main portion of a bearing device.

FIG. 2 is a view schematically illustrating a main portion of the bearing device 15. In FIG. 2, like reference numerals denote like elements illustrated in FIG. 1.

Here, a gap (turbine-side inner peripheral clearance) between the shaft 13 and the turbine-side bearing 21 is denoted by TI, a gap (compressor-side inner peripheral clearance) between the shaft 13 and the compressor-side bearing 22 is denoted by CI, a gap (turbine-side outer peripheral clearance) between the turbine-side bearing 21 and the bearing housing 14b is denoted by TO, and a gap (compressor-side outer peripheral clearance) between the compressor-side bearing 22 and the bearing housing 14b is denoted by CO.

In addition, an average (inner peripheral clearance average) of the turbine-side inner peripheral clearance TI and the compressor-side inner peripheral clearance CI is denoted by AI.

For the bearing device 15, conditions of the following expressions (1) and (2) are set.

$$TI > CI \quad (1)$$

$$(TI-CI)/AI \geq 0.2 \quad (2)$$

For the bearing device 15, the turbine-side inner peripheral clearance TI is set to be larger than the compressor-side inner peripheral clearance CI. More preferably, a ratio of a difference between the turbine-side inner peripheral clearance TI and the compressor-side inner peripheral clearance CI to the average AI of the turbine-side inner peripheral clearance TI and the compressor-side inner peripheral clearance CI is equal to or larger than 0.2. Accordingly, unstable vibration including self-excited vibration can be suppressed. As a result, when the supercharger 10 (see FIG. 1) with the bearing device 15 having the aforementioned conditions is used, noise during high-speed driving can be reduced.

For the bearing device 15, in addition to setting the inner peripheral clearances (TI>CI), the outer peripheral clearances may be set. In this case, the turbine-side outer peripheral clearance TO and the compressor-side outer peripheral clearance CO are substantially equal to each other (TO=CO). Otherwise, the compressor-side outer peripheral clearance CO is set to be larger than the turbine-side outer peripheral clearance TO(TO<CO). These further suppress the unstable vibration. In order to suppress the vibration, it has been found that "TI>CI, TO=CO" is the most effective condition, and "TI>CI, TO<CO" is the second most effective condition.

Next, results of vibration experiments on the supercharger 10 with the bearing device 15 are described with reference to FIG. 3. Here, the reference numerals illustrated in FIG. 2 are properly used in the following description.

The vibration experiments are performed on a plurality of conditions in which the differences (TI−CI) between the inner peripheral clearances are different from each other, and unstable vibration components in each condition are extracted by spectrum analysis or the like to be compared with each other.

Figure 3:
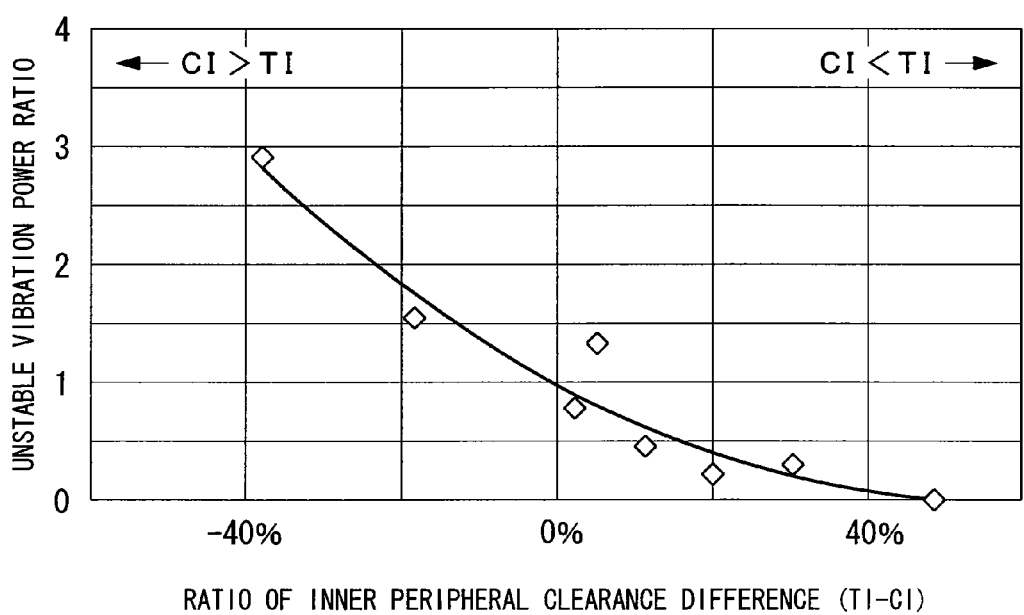
FIG. 3 is a graph illustrating results of vibration experiments on a supercharger having the bearing device.

FIG. 3 is a graph illustrating relationships between the inner peripheral clearance differences and unstable vibration power ratios.

The horizontal axis represents the ratio ((TI−CI)/AI) of the difference between the turbine-side inner peripheral clearance TI and the compressor-side inner peripheral clearance CI to the average of the turbine-side inner peripheral clearance TI and the compressor-side inner peripheral clearance CI, and the vertical axis represents the ratio of vibration power in each clearance difference condition to vibration power (estimated value) in the case where the clearance difference is zero.

Here, in a mass damper system applied with forced vibration, power is proportional to the square of the forced power. The mass damper system applied with the forced vibration may be represented by a vibration equation including general forced power as the following expression (3).

$$m(d^2x/dt^2) + c \cdot (dx/dt) + k \cdot x = F(t) \quad (3)$$

Here, F is the forced power and proportional to acceleration. Therefore, the power is proportional to the square of the acceleration.

In the graph illustrated in FIG. 3, since it is known that the power of vibration is proportional to the square of the acceleration, a value obtained by squaring data associated with the acceleration obtained during the vibration experiments is used for the vertical axis.

As illustrated in FIG. 3, it can be seen that as the ratio of the inner peripheral clearance difference (TI−CI) increases, that is, as the turbine-side inner peripheral clearance TI increases as compared with the compressor-side inner peripheral clearance CI, the unstable vibration power ratio is decreased. In addition, it can be seen that when the ratio of the inner peripheral clearance difference is equal to or larger than 0.2, unstable vibration power can be ½ or less as compared with the state where the clearance difference is zero.

In order to manufacture the aforementioned bearing structure, floating-bushes having different inner diameters need to be prepared.

Specifically, the turbine-side floating-bush may need to have the inner diameter larger than that of the compressor-side floating-bush. In order to prepare the floating-bushes, there are a method of manufacturing proper floating-bushes and a method of manufacturing average-sized floating-bushes, classifying the floating-bushes into a group with high manufacturing tolerance and a group with low manufacturing tolerance, and selecting the proper floating-bushes.

In addition, there is a method of classifying the manufactured floating-bushes into four groups (for example, A, B, C, and D) depending on inner diameter, and selecting combinations such as a combination of A and C and a combination of B and D.

In the aforementioned manufacturing method, since the turbine-side floating-bush and the compressor-side floating-bush have similar shapes, a different mark may be provided to each floating-bush for increasing identification efficiency. In addition, due to the increase in identification efficiency, errors in combinations can be prevented.

In this case, for example, different marks may be provided to the turbine-side and the compressor-side floating-bushes from each other, or a different mark may be used for each classification after the manufacturing. Otherwise, an identifiable mark (identification code) may be used for each of the manufactured floating-bushes.

While the exemplary embodiments of the invention have been described above with reference to the accompanying drawings, it should be noted that the present invention is not limited to the above-described embodiments. Shapes, combinations, and the like of the elements in the embodiments are only examples and various modifications thereof can be made without departing from the spirit and scope of the invention on the basis of design requirements or the like.

INDUSTRIAL APPLICABILITY

In the bearing structure of the rotating machine according to the invention, the unstable vibration including the self-excited vibration can be suppressed. In the rotating machine according to the invention, noise during high-speed driving can be reduced by suppressing the unstable vibration. In the method of manufacturing the bearing structure according to the invention, the low-noise bearing structure which suppresses unstable vibration can be manufactured. In the method of manufacturing the rotating machine according to the invention, the low-noise rotating machine which suppresses unstable vibration can be manufactured.

The invention claimed is:

1. A bearing structure of a rotating machine, which is disposed on a rotating shaft connecting a turbine impeller to a compressor impeller, the bearing structure comprising:
a turbine-side bearing and a compressor-side bearing each of which is a floating-bush type sliding bearing,
wherein a turbine-side inner peripheral clearance between an inner periphery of the turbine-side bearing and an outer periphery of the rotating shaft is set to be larger than a compressor-side inner peripheral clearance between an inner periphery of the compressor-side bearing and the outer periphery of the rotating shaft.

2. The bearing structure according to claim 1, wherein the ratio of the difference between the turbine-side inner peripheral clearance and the compressor-side inner peripheral clearance to the average of the turbine-side inner peripheral clearance and the compressor-side inner peripheral clearance is equal to or larger than 0.2.

3. A rotating machine that comprises a bearing structure according to claim 1, the rotating machine further comprising:
a turbine impeller;
a compressor impeller;
a rotating shaft connecting the turbine impeller to the compressor impeller; and
a housing enclosing the rotating shaft;
wherein the bearing structure rotatably supports the rotating shaft.

4. A method of manufacturing a floating-bush type bearing structure, in which a turbine-side bearing and a compressor-side bearing each of which is a floating-bush type and supports a rotating shaft are included, the method comprising:
setting a turbine-side inner peripheral clearance between an inner periphery of the turbine-side bearing and an outer periphery of the rotating shaft to be larger than a compressor-side inner peripheral clearance between an inner periphery of the compressor-side bearing and the outer periphery of the rotating shaft.

5. A method of manufacturing a rotating machine having a floating-bush type bearing structure, in which a turbine-side bearing and a compressor-side bearing each of which is a floating-bush type and supports a rotating shaft are included, the method comprising:
setting a turbine-side inner peripheral clearance between an inner periphery of the turbine-side bearing and an outer periphery of the rotating shaft to be larger than a compressor-side inner peripheral clearance between an inner periphery of the compressor-side bearing and the outer periphery of the rotating shaft.

6. The method according to claim 5, wherein a ratio of a difference between the turbine-side inner peripheral clearance and the compressor-side inner peripheral clearance to an average of the turbine-side inner peripheral clearance and the compressor-side inner peripheral clearance is equal to or larger than 0.2.

7. A rotating machine that comprises the bearing structure of claim 2, the rotating machine further comprising:
a turbine impeller;
a compressor impeller;
a rotating shaft connecting the turbine impeller to the compressor impeller; and
a housing enclosing the rotating shaft;
wherein the bearing structure rotatably supports the rotating shaft.

8. The bearing structure of the rotating machine according to claim 1, wherein the bearing structure of the rotating machine is horizontally-arranged, and further comprises lubricating oil which is lubricating oil which is supplied to a gap between the rotating shaft and the turbine-side bearing and to a gap between the rotating shaft and the compressor-side bearing.

9. The method according to claim 4, wherein the bearing structure has a floating-bush sliding bearing and is horizontally-arranged, and lubricating oil is supplied to a gap between the rotating shaft and the turbine-side bearing and to a gap between the rotating shaft and the compressor-side bearing.

10. The method according to claim 5, wherein the bearing structure has a floating-bush sliding bearing and is horizontally-arranged, and lubricating oil is supplied to a gap between the rotating shaft and the turbine-side bearing and to a gap between the rotating shaft and the compressor-side bearing.

* * * * *

UNITED STATES PATENT AND TRADEMARK OFFICE
CERTIFICATE OF CORRECTION

PATENT NO.        : 8,535,022 B2                                        Page 1 of 1
APPLICATION NO. : 12/305231
DATED             : September 17, 2013
INVENTOR(S)       : Takei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this
Fifteenth Day of September, 2015

Michelle K. Lee
*Director of the United States Patent and Trademark Office*